United States Patent [19]
Garrett

[11] Patent Number: 5,160,769
[45] Date of Patent: Nov. 3, 1992

[54] THERMAL INSULATION: $CO_2$ FILLED FOAM

[75] Inventor: Michael E. Garrett, Woking, England

[73] Assignee: The BOC Group plc, Windlesham, England

[21] Appl. No.: 561,838

[22] Filed: Aug. 2, 1990

[30] Foreign Application Priority Data

Aug. 9, 1989 [GB] United Kingdom ............ 8918218

[51] Int. Cl.$^5$ .................. F16L 59/14; B65D 88/00
[52] U.S. Cl. .................. 428/36.5; 428/35.8; 428/36.91; 428/312.6; 428/314.8; 428/317.9; 428/319.1; 428/425.8; 220/431; 220/444; 220/901; 138/143; 138/149; 138/DIG. 9
[58] Field of Search ............ 138/143, 149, DIG. 9; 220/901, 431, 444; 428/314.4, 36.5, 36.9, 36.91, 314.8, 317.9, 312.6, 319.1, 425.8, 35.8

[56] References Cited

U.S. PATENT DOCUMENTS

| | | | |
|---|---|---|---|
| 3,425,455 | 2/1969 | Kilpert | 138/149 |
| 3,812,886 | 5/1974 | Hallwood | 138/149 |
| 3,886,981 | 6/1975 | Eliason | 138/149 |
| 3,930,375 | 1/1976 | Hofmann | 220/901 |
| 4,287,245 | 9/1981 | Kikuchi | 428/314.4 |
| 4,590,971 | 5/1986 | Webster | 138/149 |
| 4,640,312 | 2/1987 | Patell | 138/149 |
| 4,706,711 | 11/1987 | Czvikovsky | 138/149 |
| 4,744,842 | 5/1988 | Webster | 138/149 |

*Primary Examiner*—Ellis P. Robinson
*Assistant Examiner*—Rena L. Dye
*Attorney, Agent, or Firm*—Carol A. Nemetz; Larry R. Cassett

[57] ABSTRACT

A pipeline has an inner surface which comes into contact with cryogenic fluid at a temperature of 70° K. The outer surface of the pipeline carries a coating of foamed polyurethane having closed cells containing carbon dioxide. The pipeline is located in an outer sleeve. The annular space defined between the pipe and the sleeve is filled with perlite powder and is able to be purged with dry nitrogen gas.

In operation with the inner surface of the pipelines subjected to a temperature of 70° K., the carbon dioxide in the cells of the polyurethane solidifies creating a vacuum therein. This increases the temperature difference across the polyurethane coating and enables the perlite powder to be maintained at a temperature above 77° K. so that the nitrogen purgant does not condense. A relatively simple alternative to conventional vacuum insulation is thereby provided.

8 Claims, 1 Drawing Sheet

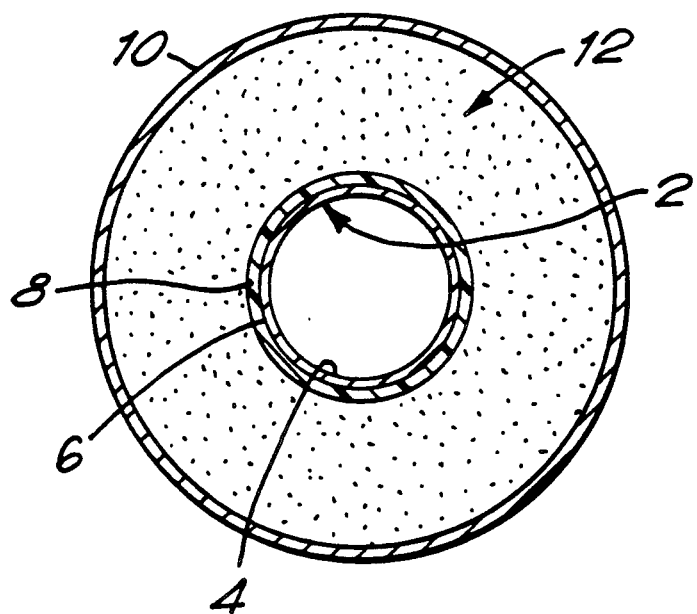

THERMAL INSULATION: CO$_2$ FILLED FOAM

TECHNICAL FIELD

This invention relates to thermal insulation. In particular, it relates to a thermally insulated apparatus which operates at below the boiling point of liquid nitrogen (that is below 77° K.).

BACKGROUND OF THE PRIOR ART

With the discovery of complex metal oxides that are superconductors at relatively high temperatures compared with traditional superconducting materials, there has been renewed interest in operating cryogenic refrigerators at about 70° K. Although this temperature is not particularly difficult to achieve, being only a few degrees lower than that at which liquid nitrogen boils under a pressure of one atmosphere, it has hitherto made necessary the use of vacuum insulation to maintain a reasonable standard of thermal insulation about the chamber or other vessel in which the superconductor operates. Whereas, for example, pipelines that conduct liquid nitrogen from a storage vessel to a plant in which it is used, may be vacuum-insulated, in practice, alternative thermal insulation typically comprising a mineral powder such as perlite is used and is housed in a space defined between the pipeline and a sleeve surrounding the pipeline. Since air will condense on one side of the cold wall the other side of which is in contact with liquid nitrogen, thereby causing a hazard and also reducing the effectiveness of insulation, it is conventional to purge the space in which the mineral powder insulant is housed with dry nitrogen. However, if the thermal insulation is intended to maintain operating temperatures below that of liquid nitrogen, the technique of nitrogen purging the insulant space is not effective as the nitrogen will itself come into contact with the cold wall and will condense.

UK Patent specification 1 425 614 discloses a cryogenic insulating sleeve for use in systems where fluids flow through transmission pipelines at cryogenic temperatures wherein the sleeve is of the vacuum type, and comprises a perlitic tubular core within a sealed envelope which envelope contains a condensible gas which fills the envelope at normal temperature and pressure conditions and which condenses a cryogenic temperature substantially to evacuate the envelope. This is an alternative kind of thermal insulation for use in thermally insulating a cryogenic pipeline conducting liquefied natural gas. It does not address the problem of providing thermal insulation for apparatus at a temperature below 77° K.

SUMMARY OF THE INVENTION

It is the aim of the present invention to provide thermally insulated apparatus capable of operating below 77° K., say at 70° K.

According to the present invention there is provided thermally-insulated apparatus including a wall one side of which is in contact with a medium at a temperature of less than 77° K. and the other side of which has adhering thereto a foamed material defining closed cells containing a substance which is gaseous at normal ambient temperatures and solid at temperatures of 77° K. and less, said foamed material facing a space which contains thermal insulation and a nitrogen atmosphere.

The invention also provides a method of thermally insulating a wall which on one side is to be exposed to a medium at a temperature of less than 77° K., comprising the steps of coating the wall with a foamed material having closed cells containing a gas which is solid at temperatures of 77° K. and less, forming an enclosure containing thermal insulant about said wall subjecting the inner surface of said wall to a cryogenic medium whereby to reduce its temperature to below 77° K., and purging the enclosure with dry nitrogen, whereby the cryogenic medium causes the gas within the cells of the foamed material to solidify thus creating a partial vacuum therein which is effective to prevent the outer surface of the foamed material reaching so low a temperature that the nitrogen purge gas condenses thereon.

The term 'gas' as used herein includes vapor within its scope.

The foamed material is typically a foamed plastics such as polyurethane. The gas contained within the cells of the foamed material is preferably carbon dioxide which changes from the gaseous to the solid state at a temperature of about 195° K. without a liquid phase being present. Other gases than carbon dioxide may be used provided they exist in the solid phase at a temperature above 70° K. Hater vapor may therefore be used instead of or in a mixture with carbon dioxide.

The foamed material is preferably provided in a layer that is at least 0.3 centimeters thick. Preferably, the thickness of the foamed layer is in the range 0.3 to three centimeters.

The thermal insulant is preferably a mineral powder such as perlite. Perlite is a naturally occurring siliceous, volcanic rock which may be used as a thermal insulant in non-expanded or expanded form.

The method and apparatus according to the invention are particularly suitable for use when the inner surface of the wall is to be subjected to a minimum temperature of 70° K. Such conditions may occur in helium and hydrogen refrigerators and liquefiers.

BRIEF DESCRIPTION OF THE DRAWINGS

The method and apparatus according the present invention will now be described by way of example of reference to the accompanying single drawing which is a section through a pipeline which is thermally insulated in accordance with the invention.

DETAILED DESCRIPTION OF THE INVENTION

While the invention is described with reference to a pipeline, it will be understood, of course, that the invention is not limited thereto since obvious other embodiments include tanks, helium and hydrogen refrigerators and liquefiers, etc.

Referring to the drawing, a pipeline 2 is of circular cross-section having an inner surface 4 which in operation is intended to come into contact with cold cryogenic fluid (for example gaseous helium) at a temperature of 70° K. The pipe is formed of a suitable steel which stays ductile at a temperature of 70° K. (for example stainless steel). The pipe 2 has an outer surface 6 which carries a coating of foamed polyurethane 8. The polyurethane coating has a thickness of 2.5 cm. It contains closed cells which at ambient temperature are filled with carbon dioxide gas. The pipe 2 is located in an outer sleeve 10. The annular space between the inner surface of the sleeve 10 and the coated outer surface 6 of the pipe 2 is filled with a mineral insulant powder such as perlite. The sleeve 10 is provided with an inlet and an outlet (not shown) whereby the perlite-filled space may be intermittently or continuously purged with dry nitrogen gas.

In order to form the apparatus shown in the drawing, the pipe is first coated with the polyurethane using carbon-dioxide as a blowing gas. A conventional spray gun may be used for this purpose. The polyurethane adheres to the outer surface of the pipe 2 and forms a foamed cellular coating having closed pores containing carbon dioxide gas. The sleeve 10 is then fitted around the pipe 2 and the annular space therebetween filled with the perlite insulant. The annular space is then purged with nitrogen to flush air therefrom. If desired, once the air has been purged from the annular space, the flow of nitrogen may be continued or alternatively can be stopped and then the space purged only intermittently with nitrogen. The pipeline may then be brought into service. One use for the pipeline is to transmit helium at a temperature of 70° K. from a source thereof to a chamber which needs to be maintained at 70° K. for superconductors located therein to function properly. As the helium flows along pipeline 2, the temperature of the carbon dioxide in the pores of the foamed polyurethane falls. At about 190° K. the carbon dioxide condenses to form a solid. Consequently, the pressure within the individual cold pores is much reduced as a result of the reduction in the volume occupied by the carbon dioxide upon its solidification. The pressure tends to fall further with decreasing temperature. Accordingly, a vacuum-insulated foam is created close to the cold wall of the pipe 2. Consequently, the heat leak through this foam is by conduction through the plastics material itself and is therefore quite low. This has the effect of raising the temperature of the outer surface of the foam to be above the nitrogen condensation point of 77° K., thereby enabling the conventional perlite thermal insulant (or other thermally insulating material) to be employed in the remaining insulating space.

Although the material of the foam of the above example is organic, it will not create a fire or explosion hazard because the only gas in contact with it is nitrogen which is itself inert. In the event of the foam cracking or failing, nitrogen will condense with loss of insulating properties but no further problems. If desired, after a chosen time in service, the pipeline may be taken out of service, the polyurethane coating removed and a new coating applied. The duration of service can be chosen so as to enable a new coating to be applied before the old one fails.

The material of the polymer foam, whether organic or inorganic, must form closed pores, filled with a condensible gas.

The method and apparatus according to the invention make possible an effective and efficient insulation at temperatures in the order of 70° K. without the need for conventional vacuum insulation.

I claim:

1. Thermally-insulated apparatus including a wall one side of which is in contact with a medium at a temperature of less than 77° K. and the other side of which has adhering thereto polymer foamed material defining closed cells containing a substance which is gaseous at normal ambient temperatures and solid at temperatures of 77° K. and less, wherein said solid creates a partial vacuum therein, said foamed material facing a space between a foam side of the wall and an outer sleeve, which space contains thermal insulation and a nitrogen atmosphere.

2. Apparatus as claimed in claim 1, in which the foamed material is a foamed plastics.

3. Apparatus as claimed in claim 2, in which the foamed plastics is a polyurethane.

4. Apparatus as claimed in claim 1, in which the gas contained within the cells of the foamed material is carbon dioxide.

5. Apparatus as claimed in claim 1, in which the foamed material is in a layer that is at least 0.3 centimeters thick.

6. Apparatus as claimed in claim 5, in which the layer has a thickness in the range 0.3 to 3 centimeters.

7. Apparatus as claimed in claim 1, in which the thermal insulant is a mineral powder.

8. Apparatus as claimed in claim 7, in which the mineral powder is perlite.

* * * * *